United States Patent
Knight et al.

(10) Patent No.: US 12,475,503 B2
(45) Date of Patent: Nov. 18, 2025

(54) REPLACING AN UNAVAILABLE ITEM IN AN ORDER USING A TRAINED OUTCOME PREDICTION MODEL

(71) Applicant: Maplebear Inc., San Francisco, CA (US)

(72) Inventors: Benjamin Knight, Oakland, CA (US); Saumitra Maheshwari, Sunnyvale, CA (US); Jennie Braunstein, San Francisco, CA (US); Darren Johnson, Elko, NV (US); Kenneth Jason Sanchez, Orange, CA (US); Christopher Billman, Chicago, IL (US)

(73) Assignee: Maplebear Inc., San Francisco, CA (US)

( * ) Notice: Subject to any disclaimer, the term of this patent is extended or adjusted under 35 U.S.C. 154(b) by 236 days.

(21) Appl. No.: 18/485,797

(22) Filed: Oct. 12, 2023

(65) Prior Publication Data
US 2025/0124485 A1   Apr. 17, 2025

(51) Int. Cl.
*G06Q 30/00* (2023.01)
*G06N 20/00* (2019.01)
*G06Q 30/0601* (2023.01)

(52) U.S. Cl.
CPC ......... *G06Q 30/0631* (2013.01); *G06N 20/00* (2019.01)

(58) Field of Classification Search
None
See application file for complete search history.

(56) References Cited

U.S. PATENT DOCUMENTS

| 12,367,518 B2* | 7/2025 | Cho .................... G06Q 30/0635 |
| 2016/0140632 A1* | 5/2016 | Kandala ............. G06Q 30/0603 |
| | | 705/26.61 |
| 2025/0045813 A1* | 2/2025 | Bowen ............... G06Q 30/0635 |

* cited by examiner

*Primary Examiner* — Mila Airapetian
(74) *Attorney, Agent, or Firm* — Fenwick & West LLP

(57) ABSTRACT

An online system receives orders from users and dispatches pickers to fulfill the orders by obtaining ordered items at a retailer. If an ordered item cannot be found by a picker, the picker may refund the item or attempt to find a replacement item. While obtaining a replacement item may increase revenue to the online system, it can also cause a bad outcome for user experience (e.g., an unacceptable replacement item, a refund request of the replacement item, etc.). To balance these interests, the online system trains a model to predict an outcome metric comprising a likelihood of a bad outcome from replacing an item or an expected amount of profit to the online system from a replacement item. The online system compares the outcome metric to a threshold to determine whether to promote or dissuade the picker from replacing a not-found item.

20 Claims, 4 Drawing Sheets

REPLACING AN UNAVAILABLE ITEM IN AN ORDER USING A TRAINED OUTCOME PREDICTION MODEL

BACKGROUND

Online concierge systems receive orders for items from customers and allocate the orders to pickers (or shoppers), who fulfill the orders. To fulfill an order, a picker to whom the order was allocated obtains items in the order from a retailer. The picker subsequently delivers the obtained items to a customer.

However, an item included in an order may be out of stock or otherwise unavailable at a retailer identified by an order. While an online system may refund a customer when an item included in an order is unavailable, the online concierge system may mitigate an inability to obtain an item included in an order from a retailer by allowing a picker fulfilling the order to select a replacement item from the retailer for the item that is unavailable. Obtaining a replacement item prevents the online concierge system from lost revenue that would occur from refunding the customer for an unavailable item by providing the online concierge system with revenue from the replacement item.

Although a picker obtaining a replacement item for an item in an order that is unavailable mitigates lost revenue from the unavailable item, obtaining a replacement item may cost the online concierge system more than refunding a customer for an item that is unavailable. Obtaining a replacement item takes additional time for a picker, increasing time spent for order fulfillment. Further, if a replacement item is unsatisfactory to a customer, the online concierge system provides a refund for the replacement item included in the order in addition to having obtained the replacement item. The increased time to obtain replacement items and potential for refunding a customer after obtaining a replacement item make obtaining a replacement item potentially more costly to an online concierge system than refunding an item that is unavailable.

SUMMARY

In accordance with one or more aspects of the disclosure, an online concierge system receives an order from a customer. The order includes one or more items and identifies a retailer from which the one or more items are to be obtained. In various embodiments, the order includes a location and a time interval for delivery of the one or more items included in the order, although different or additional information may be included in the order in various embodiments.

The online concierge system allocates the order to a picker, who obtains the items included in the order from the retailer identified by the order. For example, the picker selects the order from the online concierge system 140 and obtains the items included in the order from the retailer identified in the order. In other embodiments, the online concierge system allocates the order to the picker for fulfillment from the retailer identified by the order.

As the picker obtains items included in the order from the retailer identified by the order, one or more items included in the order may be unavailable from the retailer. For example, an item included in the order has low inventory at the retailer when the customer creates the order, and the item is subsequently sold out when the picker is fulfilling the order. As another example, inventory information the online concierge system receives from a retailer is not current, so a customer includes an item that is out of stock at the retailer in an order.

To account for one or more items being unavailable at a retailer when the order is fulfilled, a collection interface displayed by a picker client device of the picker allows the picker to transmit an indication that the item is unavailable at the retailer. For example, the picker selects an item included in the order and an interface element causing the picker client device to transmit the indication the selected item is unavailable at the retailer. The indication includes an identifier of the item that is unavailable (the "unavailable item"), an identifier of the order, and an identifier of the retailer. In some embodiments, the indication includes different or additional information.

For an unavailable item in the order, the picker may transmit a refund request to the online concierge system, which refunds a price of the unavailable item to the customer. Alternatively, the picker may obtain a replacement item for the unavailable item and include the replacement item in the order in place of the unavailable item. Allowing a picker to replace the unavailable item with a replacement item averts lost revenue to the online concierge system from providing a refund for the unavailable item to the customer.

While, including a replacement item in an order for the unavailable item may increase revenue to the online concierge system for the order, including a replacement item in an order in place of the unavailable item may incur additional costs to the online concierge system. For example, identifying a replacement item takes more time for a picker, delaying order fulfillment. Additionally, in many scenarios, a customer does not identify potential replacement items when providing the order to the online concierge system, so the customer may be dissatisfied with a replacement item selected by the picker. When the customer is not satisfied with a replacement item included in an order, the customer transmits an appeasement request to the online concierge system, which refunds the cost of the unavailable item, or another amount, to the customer. Given the additional time for a picker to identify a replacement item and potential for the online concierge system to lose revenue from providing a refund to the customer to satisfy an appeasement request, including a replacement item for the unavailable item may be more costly to the online concierge system than refunding the customer for the unavailable item in different scenarios.

To mitigate compensating the customer for a replacement item replacing an unavailable item in the order, the online concierge system trains an outcome prediction model that receives order features of the order, the unavailable item from the order, and customer features of the customer from whom the order was received. The outcome prediction model receives a candidate replacement item that replaces the unavailable item in various embodiments. In various embodiments, the outcome prediction model also receives contextual features describing prior replacement of items in orders. Based on the received inputs, the outcome prediction model outputs a predicted outcome metric from replacing the unavailable item with another item. In embodiments where the outcome prediction model receives a candidate replacement item as an input, the outcome prediction model outputs a predicted outcome metric from replacing the unavailable item with the candidate replacement item, allowing assessment of using the candidate replacement item as a replacement for the unavailable item.

The outcome prediction model comprises a set of weights stored on one or more computer-readable media. These weights are parameters used by the outcome prediction model to transform order features, customer features, an unavailable item, and a candidate replacement item (and contextual features) into a predicted outcome metric for replacing the unavailable item with the candidate replacement item. The weights may be generated through a training process, where the outcome prediction model is trained based on a set of training examples generated from previously fulfilled orders including a replacement item in place of an item and labels associated with the training examples. The training examples include combinations of an item, a replacement item, customer features, and order features (as well as contextual features in various embodiments) determined from the previously fulfilled orders, with a label applied to each training example indicating an outcome of fulfilling the previously fulfilled order with the replacement item in place of the item. In some embodiments, the label is an indication whether a negative outcome occurred from the previously fulfilled order being fulfilled with the replacement item in place of the item. Alternatively, the label is an amount of profit to the online concierge system from fulfilling the previously fulfilled order with the replacement item in place of the item.

In various embodiments, the training process includes applying the outcome prediction model to a training example, comparing a predicted outcome metric of the outcome prediction model to the label associated with the training example, and updating weights of the outcome prediction model through a back-propagation process. The weights may be stored on one or more computer-readable media for subsequent application to new customer features and online concierge system features.

In some embodiments, the predicted outcome metric from the outcome prediction model is a predicted probability of a negative outcome from replacing the unavailable item with a candidate replacement item. A negative outcome for an order comprises one or more of the online concierge system receiving negative feedback for a replacement item when included in the order, receiving an appeasement request (e.g., a request for a refund) from the customer from whom the order was received with the replacement item included in the order, or receiving an indication the item was missing from the order from the customer. In other embodiments, the online concierge system maintains different or additional criteria for determining a negative outcome occurred from fulfilling the order with a replacement item in place of the unavailable item.

In other embodiments, the predicted outcome metric is an expected amount of profit to the online concierge system from fulfilling the order including the replacement item in place of the unavailable item. When determining the expected amount of profit determined by the outcome prediction model accounts for an amount of revenue the online concierge system obtains from including a replacement item in the order reduced by a cost incurred from the picker obtaining the replacement item and by a cost to the online concierge system for resolving an appeasement request from the customer in response to the customer being dissatisfied with inclusion of the replacement item in the order in place of the unavailable item. The expected amount of profit may also account for an expected amount of long-term profit to the online concierge system from the customer over an extended time interval (which may be specified by the online concierge system) when replacing the unavailable item with the replacement item. As an example, the outcome prediction model determines an expected amount of profit as a sum of an amount of revenue the online concierge system obtains from including a replacement item in the order and the long-term profit to the online concierge system from the customer when replacing the unavailable item with the replacement item reduced by a cost incurred from the picker obtaining the replacement item and reduced by a cost to the online concierge system for resolving an appeasement request from the customer in response to the customer being dissatisfied with inclusion of the replacement item in the order in place of the unavailable item. In embodiments where the outcome prediction model receives a candidate replacement item as an input, the expected amount of profit may be determined by subtracting a cost incurred from the picker obtaining the replacement item and reduced by a cost to the online concierge system for resolving an appeasement request from the customer in response to the customer being dissatisfied with inclusion of the replacement item in the order in place of the unavailable item from an amount of revenue the online concierge system obtains from including a replacement item in the order. In other embodiments, the predicted outcome metric represents another measure of an outcome of including the replacement item in the order in place of item.

The online concierge system determines whether the predicted outcome metric satisfies one or more criteria to determine whether refunding the customer a cost of item is more beneficial than fulfilling the order with the replacement item in place of the unavailable item. In embodiments where the predicted outcome metric is a predicted probability of a negative outcome, the online concierge system determines whether the predicted probability of the negative outcome is greater than a threshold probability. In embodiments where the predicted outcome metric is an expected amount of profit to the online concierge system, the online concierge system determines whether the expected amount of profit to the online concierge system is less than a threshold amount. The online concierge system may maintain one or more global criteria to which the predicted outcome metric is compared or may maintain one or more picker-specifier criteria based on attributes of the picker for evaluating the predicted outcome metric. In various embodiments, the picker-specific criteria are based on a number of orders the picker previously fulfilled for the online concierge system.

In response to the predicted outcome metric satisfying at least one criterion, the online concierge system determines refunding the customer for item is more beneficial than fulfilling the order with a replacement item in place of the unavailable item. For example, refunding the customer for the unavailable item is more beneficial in response to a predicted probability of a negative outcome exceeding the threshold probability. As another example, refunding the customer for the unavailable item is more beneficial in response to an expected amount of profit to the online concierge system being less than a threshold amount.

When it is more beneficial to refund the customer for the unavailable item, the online concierge system transmits instructions to a picker client device of the picker that modify one or more collection interfaces to increase a difficulty for the picker obtaining a replacement item for the unavailable item. For example, a collection interface is modified to display a notification message to the picker that the online concierge system recommends refunding the customer for item. As another example, a collection interface is modified to limit identification of a replacement item to the picker manually entering information identifying the replacement item by preventing the picker client device from extracting an identifier of a replacement item from an image captured by the picker client device. Limiting identification of the replacement item to manual entry of an identifier of a replacement item for the unavailable item through the collection interface, making identification of the replacement item more time consuming and cumbersome. In other embodiments, the collection interface is modified to prevent identification of a replacement item for the unavailable item. The online concierge system may determine different modifications to the collection interface based on characteristics of the picker, based on the predicted outcome metric, or based on other information. Modifying one or more collection interfaces in response to determining the predicted outcome metric satisfies one or more criteria allows the online concierge system to increase a difficulty of the picker obtaining a replacement item for the unavailable item, discouraging the picker from obtaining a replacement item and encouraging the picker to instead provide a refund for the unavailable item.

In embodiments where the outcome prediction model receives a candidate replacement item as input, the online concierge system may transmit instructions to the picker client device that prevent inclusion of the candidate replacement item in an order in response to a predicted outcome metric accounting for the candidate replacement item satisfying at least one criterion. For example, if replacing the unavailable item with the candidate replacement item results in an expected amount of profit to the online concierge system that is less than the threshold amount, instructions transmitted by the online concierge system prevent selection of the candidate replacement item for the unavailable item. In some embodiments, the instructions transmitted to the picker client device identify a set of validated replacement items to the picker. Application of the outcome prediction model to order features of the order, the unavailable item from the order, a validated replacement item and customer features of the customer from whom the order was received outputs a predicted outcome metric that does not satisfy at least one criterion. For example, application of the outcome prediction model to order features of the order, the unavailable item from the order, a validated replacement item and customer features of the customer from whom the order was received outputs an expected amount of profit to the online concierge system exceeding the threshold amount. The instructions may cause display of the validated replacement items in a ranking based on corresponding output of the outcome prediction model. For example, the instructions cause the picker client device to display the set of validated replacement items in a ranking where validated replacement items with larger expected amounts of profit to the online concierge system are displayed in higher positions in the ranking than validated replacement items with smaller expected amounts of profit to the online concierge system.

Hence, the online concierge system may leverage the outcome prediction model to determine whether to allow a picker to replace an unavailable item with a candidate replacement item. This allows the online concierge system to influence how a picker replaces an unavailable item to minimize a probability of the replacement causing a negative outcome from the customer for whom the item is being replaced. Further, the online concierge system may account for predicted outcome metrics for replacing an unavailable item with different candidate replacement items to identity certain candidate replacement items to a picker that increase a likelihood of a positive outcome for the online concierge system when used to replace an unavailable item in an order. This allows the online concierge system to use predicted outcome metrics from the outcome prediction model to influence picker actions when replacing an unavailable item by limiting items that may be used to replace an unavailable item or by encouraging the picker to select particular items when replacing an unavailable item.

DETAILED DESCRIPTION

Figure 1:
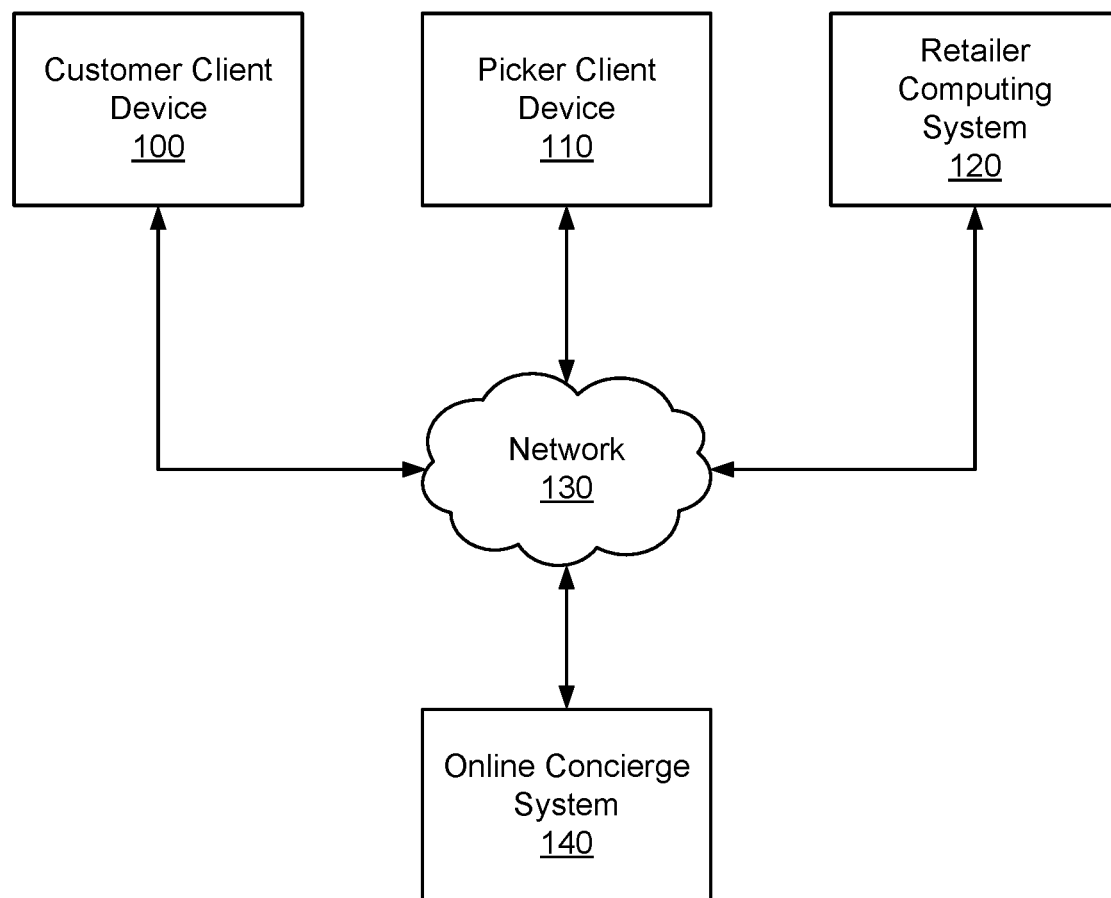
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item," as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

In various embodiments, one or more collection interfaces displayed by the picker client device 110 include one or more interface elements that, when selected by a picker, identify an item included in an order as unavailable. For example, an item included in an order fulfilled by the picker is unavailable, and selection of an interface element by the picker indicates the item is unavailable. In various embodiments, when a picker selects an interface element indicating an item is unavailable, the picker client device 110 transmits an indication to the online concierge system 140 that identifies the order, identifies the item that is unavailable, and identifies a retailer. In response to receiving a selection that an item is unavailable, the picker client device 110 presents one or more collection interfaces enabling the picker to select a replacement item that is included in the order in place of the item that is unavailable. A collection interface presented in response to the picker identifying an item is unavailable may capture information identifying a replacement item from a scanner or a camera included in the picker client device 110. The picker client device 110 transmits information captured by the picker client device 110 identifying a replacement item to the online concierge system 140 that identifies the order, the replacement item, and item that is unavailable at the retailer.

Additionally, a collection interface presented in response to the picker indicating an item in an order is unavailable includes one or more interface elements that transmit a refund request for the unavailable item. The refund request identifies the order and the unavailable item to the online concierge system 140. In response to receiving the refund request, the online concierge system 140 refunds the customer from whom the identified order was received an amount corresponding to the unavailable item for the order.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
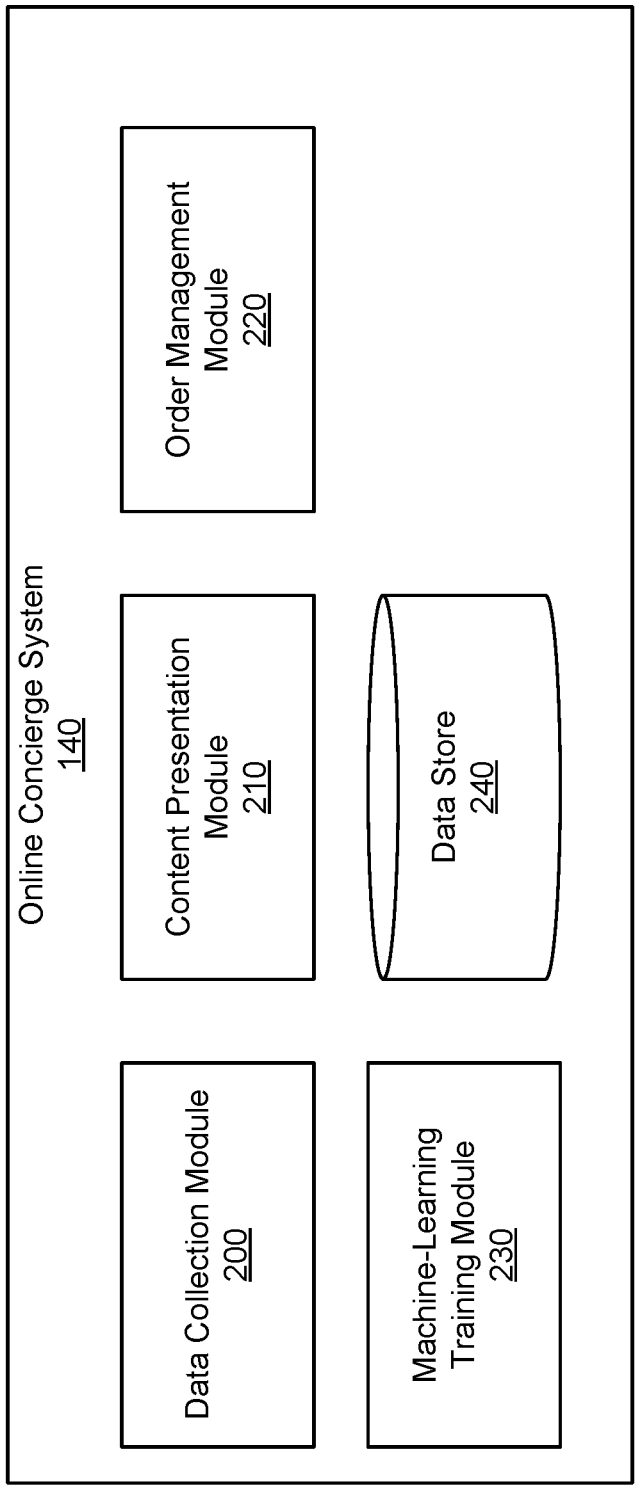
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weigh the score for an item based on the predicted availability of the item. Alternatively, the content presentation module 210 may filter out items from presentation to a customer based on whether the predicted availability of the item exceeds a threshold.

The order management module 220 manages orders for items from customers. The order management module 220 receives orders from a customer client device 100 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

In various embodiments, the order management module 220 transmits instructions to a picker client device 110 to modify one or more collection interfaces used by pickers obtaining items for one or more orders. As further described below in conjunction with FIGS. 3 and 4, the order management module 220 applies a trained outcome prediction model to an order when the order management module 220 receives an indication that an item included in the order is unavailable at a retailer. In response to a predicted outcome metric from the outcome prediction model satisfying one or more criterion, the order management module 220 determines a greater benefit to the online concierge system 140 from refunding the unavailable item rather than from obtaining a replacement item for the unavailable item. To increase a probability of the picker refunding the unavailable item rather than obtaining a replacement item, instructions transmitted by the order management module 220 display a notification to the picker with a recommendation to refund the unavailable item, limit a collection interface limit to receiving identification of the replacement item for an item through manual of an identifier of the replacement item by the picker (i.e., disabling the picker client device 110 from obtaining an identifier of the replacement item through a scanner or a camera), disabling identification of a replacement item, or other modification to a collection interface increasing a difficulty of identifying a replacement item, as further described below in conjunction with FIGS. 3 and 4.

In some embodiments, the instructions transmitted by the order management module 220 prevent a picker from replacing an unavailable item with a replacement item identified by the picker in response to a predicted outcome metric from applying the outcome prediction metric to inputs including the replacement item identified by the picker satisfying at least one criterion, as further described below in conjunction with FIGS. 3 and 4. The instructions transmitted to the picker client device 110 may additionally identify one or more validated replacement items for display to the picker. A validated replacement item is a replacement item resulting in a predicted outcome metric from the outcome prediction model that does not satisfy at least one criterion when the replacement item is input to the outcome metric. Hence, a validated replacement item results in a greater benefit to the online concierge system 140 from replacing an unavailable item with the validated replacement item than refunding the unavailable item. The instructions transmitted by the order management module 220 may display the set of validated replacement items in an order based on predicted outcome metrics corresponding to different validated replacement items. For example, the instructions cause the picker client device 110 to display a set of validated replacement items where validated replacement items with higher expected amounts of profit to the online concierge system 140 from the outcome prediction model have higher positions in the ranking. Alternatively, the instructions cause the picker client device 110 to display a set of validated replacement items where validated replacement items with lower probabilities of negative outcomes for the online concierge system 140 from the outcome prediction model have higher positions in the ranking.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross-entropy loss function. The machine learning training module 230 updates the set of parameters for the machine learning model based on the score generated by the loss function. For example, the machine learning training module 230 may apply gradient descent to update the set of parameters.

As further described below in conjunction with FIGS. 3 and 4, the machine-learning training module 230 trains and stores an outcome prediction model that outputs a predicted outcome metric for an order when an unavailable item in an order is replaced by a replacement item. In some embodiments, the predicted outcome metric is a predicted probability of a negative outcome from replacing the unavailable item with a replacement item. For example, a negative outcome for an order comprises one or more of the online concierge system 140 receiving negative feedback for a replacement item when included in the order, the online concierge system 140 receiving an appeasement request (e.g., a request for a refund) from the customer from whom the order was received with the replacement item included in the order, or the online concierge system 140 receiving an indication the item was missing from the order from the customer. In other embodiments, the online concierge system 140 maintains different or additional criteria for determining a negative outcome occurred from fulfilling the order with a replacement item in place of the unavailable item. In other embodiments, the predicted outcome metric is an expected amount of profit to the online concierge system 140 from fulfilling the order including the replacement item in place of the unavailable item.

In various embodiments, the outcome prediction model determines the predicted outcome metric based on an item, order features of an order, customer features of a customer from whom the order was received, and, in some embodiments, contextual features for one or more items in the order. The outcome prediction model additionally receives a candidate replacement item as an input in some embodiments. Example order features include a gross market value (or amount of revenue to the online concierge system 140) of the item included in the order, a cost of the replacement item for the retailer identified by the order, a predicted availability of the item originally included in the order at the retailer identified by the order, or other information describing attributes of the item originally included in the order or of the replacement item. Example customer features include a mean profit to the online concierge system 140 per replacement of an item with a replacement item for orders received from the customer, a probability of the customer: providing negative feedback for an order, requesting a refund from an order, or transmitting a notification for a replacement item included in an order, a measure of the customer's historical interaction with providing ratings for orders, a number of orders previously received from the customer, or other information describing prior interactions by the. Example contextual features include a mean cost to the online concierge system 140 from previously received appeasement requests from customers dissatisfied with replacement items from the location identified in the order, an average cost to the online concierge system 140 from appeasement requests from customers dissatisfied with replacement items having an item category including an item that was replaced by a replacement item, or other characteristics of an item or a of retailer.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

Figure 3:
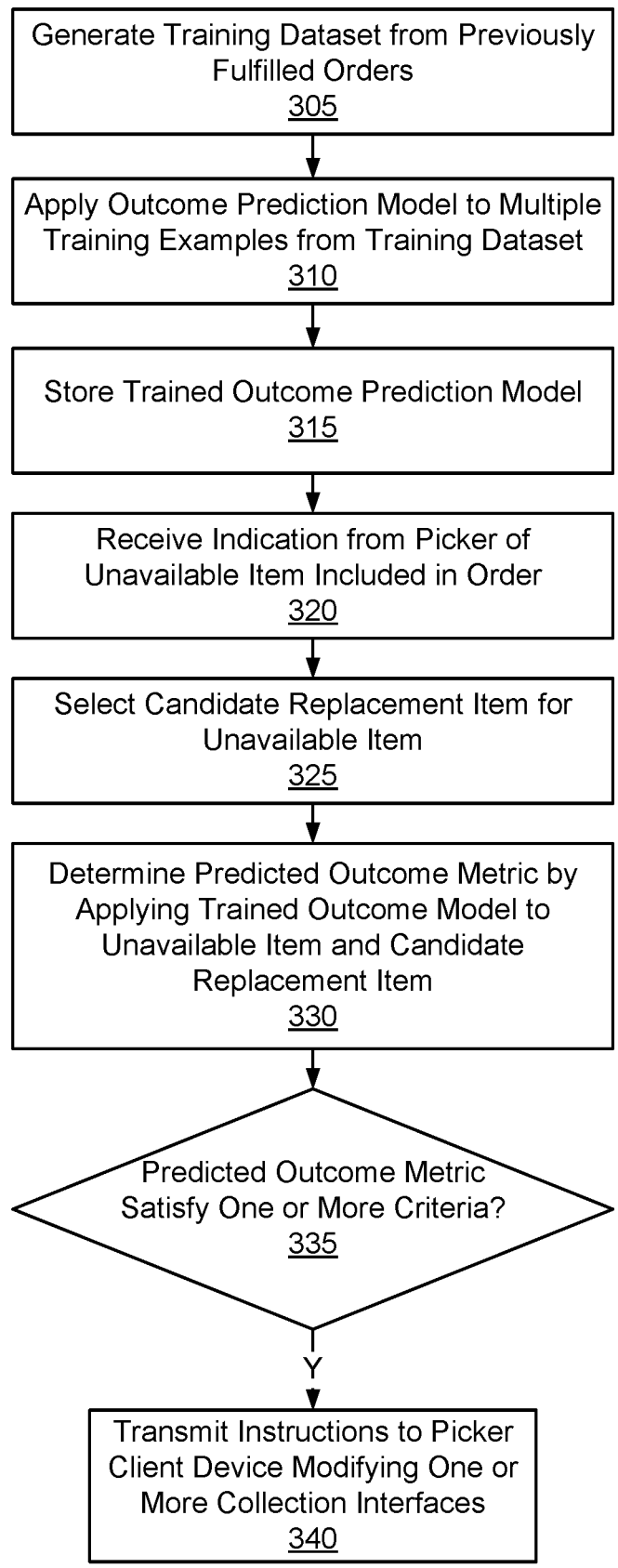
FIG. 3 is a flowchart of a method for determining when a picker obtains a replacement item for an item included in an order using a trained outcome prediction model, in accordance with one or more embodiments.

FIG. 3 is a flowchart of a method for determining when a picker obtains a replacement item for an item included in an order using a trained outcome prediction model, in accordance with some embodiments. Alternative embodiments may include more, fewer, or different steps from those illustrated in FIG. 3, and the steps may be performed in a different order from that illustrated in FIG. 3. These steps may be performed by an online concierge system (e.g., online concierge system 140). Additionally, each of these steps may be performed automatically by the online concierge system without human intervention.

An online concierge system 140 receives orders from customers that each include one or more items and identify a retailer from which the one or more items are to be obtained. The online concierge system 140 allocates an order to a picker, who obtains the items in the order from the retailer identified by the order. The picker fulfills the order by delivering the items included in the order to a location specified by the order.

As the picker obtains items in an order from a retailer, one or more items included in an order may be unavailable at the retailer when the picker fulfills the order. For example, an item included in the order has low inventory at the retailer when the customer creates the order, and the item is subsequently sold out at the retailer when the picker is fulfilling the order. As another example, inventory information the online concierge system 140 receives from a retailer is not current, so a customer includes an item that is out of stock at the retailer in an order. To account for an item in an order that is unavailable at a retailer when an order is fulfilled (an "unavailable item"), a picker transmits a refund request to the online concierge system 140, which refunds a price of the unavailable item to the customer. For example, a collection interface on a picker client device 110 used by the picker when fulfilling an order includes an interface element that, when selected by the picker, transmits a refund request for an identified item to the online concierge system 140.

However, a picker may alternatively obtain a replacement item for an unavailable item in an order and include the replacement item in the order in place of the unavailable item. Allowing a picker to obtain a replacement item allows the online concierge system 140 to avert lost revenue from refunding a customer for an unavailable item in an order. For example, a picker identifies an unavailable item in an order via a collection interface displayed by the picker client device 110 of the picker, which subsequently displays one or more additional collection interfaces where the picker provides information identifying a replacement item for the unavailable item obtained by the picker.

Although including a replacement item in an order for an unavailable item may increase revenue to the online concierge system 140 from the order when an item in an order is unavailable, including a replacement item in an order in place of an unavailable item may incur additional costs to the online concierge system 140. In various scenarios, the costs incurred in obtaining the replacement item are greater than a cost of refunding the unavailability item. For example, identifying a replacement item takes more time for a picker, delaying order fulfillment and increasing a labor cost to the picker. Additionally, in many scenarios, a customer does not identify potential replacement items, so the customer may be dissatisfied with a replacement item selected by a picker. When the customer is not satisfied with a replacement item included in an order, the customer transmits an appeasement request to the online concierge system 140, which refunds the cost of the unavailable item, or another amount, to the customer in response to the appeasement request. Given the additional time for a picker to identify a replacement item and a potential for the online concierge system 140 to refund to the customer because of the replacement item, obtaining a replacement item may result in a greater cost to the online concierge system 140 than a cost of refunding an unavailable item. Hence, refunding a customer for an unavailable item is more beneficial to the online concierge system 140 than obtaining a replacement item in different scenarios.

To evaluate whether to have a picker determine a replacement item for an unavailable item in an order or to refund a customer for an unavailable item, the online concierge system 140 generates 305 a training dataset for an outcome prediction model based on historical interactions with customers by the online concierge system 140. To generate 305 the training dataset, the online concierge system 140 retrieves previously fulfilled orders for various customers of the online concierge system 140. In various embodiments, the online concierge system 140 retrieves orders that were fulfilled in a specific time interval. As another example, the online concierge system 140 retrieves that were fulfilled to locations within a particular geographic region.

From the previously fulfilled orders, the online concierge system 140 identifies previously fulfilled orders including at least one replacement item and determines order features, customer features, and contextual features for each identified previously fulfilled order. In some embodiments, the online concierge system 140 also determines picker features for a picker who fulfilled an identified previously fulfilled order. Example order features include a gross market value (or amount of revenue to the online concierge system 140) of an item originally included in the previously fulfilled order, a cost of the replacement item included in the order in place of the item for the retailer identified by the previously fulfilled order, a predicted availability of the item originally included in the previously fulfilled order at the retailer identified by the previously fulfilled order, or other information describing attributes of the item originally included in the previously fulfilled order or the replacement item included in the previously fulfilled order. In some embodiments, the online concierge system 140 determines the predicted availability of the item originally included in the previously fulfilled order through a trained availability model.

Example customer features include a mean profit to the online concierge system 140 per replacement of an item with a replacement item for orders received from the customer, a measure of the customer's historical interaction with providing ratings for orders, a number of orders previously received from the customer, a probability of the customer performing one or more of: providing negative feedback for an order, requesting a refund from an order, or transmitting a notification for a replacement item included in an order, or other information describing interactions with the online concierge system 140 based on orders. Example contextual features include a mean cost to the online concierge system 140 from previously received notifications for replacement items from the location identified in the order, an average cost to the online concierge system 140 from notifications for replacement items having an item category including an item in a previously fulfilled order that was replaced by a replacement item, or other characteristics of an item or a retailer included in a previously fulfilled order.

From the identified previously fulfilled orders, the online concierge system 140 generates 140 multiple training examples. Each training example includes an item included in an identified previously fulfilled order, a replacement item included in the identified previously fulfilled order in place of the item, one or more order features, one or more customer features, and one or more contextual features for the identified previously fulfilled order. A label is applied to each training example, with the label having an outcome metric for the identified previously fulfilled order when the replacement item was included in the previously fulfilled order in place of the item. In some embodiments, a label includes an indication whether the identified previously fulfilled order has a negative outcome. The online concierge system 140 maintains one or more criteria for identifying a negative outcome for an order, and determines the negative outcome for the order in response to at least one criterion being satisfied by attributes of the order. Example criteria for identifying a negative outcome for an order include the online concierge system 140 receiving negative feedback for a replacement item included in the order, the online concierge system 140 receiving an appeasement request (e.g., a request for a refund) was received from the customer from whom the order was received, or the online concierge system 140 receiving an indication that an item was missing from the order from the customer from whom the order was received. In various embodiments, the online system 140 maintains different or additional criteria for identifying a negative outcome for an order. The label for a training example has a first value in response to the online concierge system 140 determining a negative outcome occurred (i.e., determining attributes of the order satisfy at least one criterion for a negative outcome) for the identified previously fulfilled order and has a different second value in response to the online concierge system 140 determining a negative outcome did not occur for the identified previously fulfilled order (i.e., determining attributes of the order do not satisfy at least one criterion for a negative outcome) in various embodiments.

Alternatively, the outcome metric for an identified previously fulfilled order is an amount of profit to the online concierge system 140 from including the replacement item in a training example in an identified previously fulfilled order in place of the item included in the training example. In various embodiments, the online concierge system 140 determines the amount of profit to the online concierge system 140 by determining a product of the gross market value of the replacement item and a percentage of the gross market value of the replacement item received by the online concierge system 140 and subtracting a cost incurred to the online concierge system 140 for the time spent by a picker to obtain the replacement item and a cost incurred to the online concierge system 140 for resolving an appeasement request from a customer in response to the replacement item from the product. The expected amount of profit may also account for an expected amount of long-term profit to the online concierge system from the customer over an extended time interval (which may be specified by the online concierge system) when replacing the unavailable item with the replacement item. As an example, the outcome prediction model determines an expected amount of profit as a sum of an amount of revenue the online concierge system obtains from including a replacement item in the order and the long-term profit to the online concierge system from the customer when replacing the unavailable item with the replacement item reduced by a cost incurred from the picker obtaining the replacement item and reduced by a cost to the online concierge system for resolving an appeasement request from the customer in response to the customer being dissatisfied with inclusion of the replacement item in the order in place of the unavailable item. The online concierge system 140 may determine the long-term profit from a customer by identifying other customers having a threshold measure of similarity (e.g., having embeddings with at least a threshold measure of similarity to an embedding of the customer) and amounts of profit received from the identified other customers over one or more time intervals. The online concierge system 140 may train a long-term profit model that is applied to characteristics of a customer to determine an expected amount of profit from the customer over the extended time interval, with the long-term profit model trained using training examples as further described above in conjunction with FIG. 2. In embodiments where the outcome prediction model receives a candidate replacement item as an input, the expected amount of profit may be determined by subtracting a cost incurred from the picker obtaining the replacement item and reduced by a cost to the online concierge system for resolving an appeasement request from the customer in response to the customer being dissatisfied with inclusion of the replacement item in the order in place of the unavailable item from an amount of revenue the online concierge system obtains from including a replacement item in the order. In embodiments where the label applied to a training example includes the amount of profit to the online concierge system 140 from the replacement item allows the training example to quantify an effect of obtaining the replacement item on profit to the online concierge system 140.

The outcome prediction model comprises a set of weights stored on a non-transitory computer readable storage medium in various embodiments. For training, the online concierge system 140 initializes a network of a plurality of layers comprising the outcome prediction model, with each layer including one or more weights. Different weights are applied to different order features, customer features, and contextual features in various embodiments. The outcome prediction model receives, an item included in the order, customer features of a customer from whom the order was received, features of the order, and contextual features as inputs and outputs a predicted outcome metric. The outcome prediction model may additionally receive a candidate replacement item as another input, with the candidate replacement item intended to replace the item included in the order. In some embodiments, the predicted outcome metric is a probability of a negative outcome from the customer in response to including the replacement item in the order in response to the item being unavailable. Alternatively, the predicted outcome metric is an expected amount of profit to the online concierge system 140 in response to including the replacement item in the order in response to the item being unavailable.

After initializing the set of weights comprising the outcome prediction model, the online concierge system 140 applies 310 the outcome prediction model to multiple training examples of the training dataset to generate the parameters (e.g., the weights) for the outcome prediction model. As further described above, in various embodiments, a training example includes a combination of an item, a replacement item, customer features, and order features. In some embodiments, the outcome prediction model also receives contextual features as input. A label applied to the training example indicates an outcome metric for the training example, such as an indication whether a negative outcome occurred for the training example or an amount of profit to the online concierge system 140 for replacing the item in the training example with the replacement item in the training example. Applying the outcome prediction model to a training example generates the predicted outcome metric for including the replacement item of the training example in an order in response to the item of the training example being unavailable given the customer features, order features, and contextual features for the training example in various embodiments.

For each training example to which the outcome prediction model is applied, the online concierge system 140 generates a score comprising an error term based on the predicted outcome metric for the training example and the label applied to the training example. The error term is larger when a difference between the predicted outcome metric and the label applied to the training example is larger and is smaller when the difference between the predicted outcome metric and the label applied to the training example is smaller. In various embodiments, the online concierge system 140 generates the error term using a loss function based on a difference between the predicted outcome metric and the label applied to the training example. Example loss functions include a mean square error function, a mean absolute error, a hinge loss function, and a cross-entropy loss function.

The online concierge system 140 backpropagates the error term to update the set of parameters comprising the outcome prediction model and stops backpropagation in response to the error term, or to the loss function, satisfying one or more criteria. For example, the online concierge system 140 backpropagates the error term through the outcome prediction model to update parameters of the outcome prediction model until the error term has less than a threshold value. For example, the online system 140 may apply gradient descent to update the set of parameters. The online concierge system 140 stores 315 the set of parameters comprising the trained outcome prediction model on a non-transitory computer readable storage medium after stopping the backpropagation.

After storing 315 the trained outcome prediction model, the online concierge system 140 receives 320 an indication from a picker of an unavailable item included in an order received from a customer. In various embodiments in response to receiving 320 the indication, the online concierge system 140 selects 325 a candidate replacement item for the unavailable item identified by the indication. For example, the online concierge system 140 applies a trained replacement item selection model to attributes of the unavailable item included in the indication, characteristics of the customer from whom the item was received, and attributes of the retailer identified in the order. The trained replacement item selection model outputs the candidate replacement item in some embodiments, while in other embodiments, the online concierge system 140 selects the candidate replacement item from a ranking based on scores output by the trained replacement item selection model. Alternatively, the received indication includes the candidate replacement item. For example, the received indication includes a candidate replacement item selected by the picker to replace the unavailable item.

The online concierge system 140 determines 330 a predicted outcome metric for replacing the unavailable item included in the order with another item by applying the trained outcome prediction model to the combination of the unavailable item, customer features for the customer from whom the order was received, order features for the order, and contextual features for the order. The online concierge system 140 may determine 330 the predicted outcome metric for replacing the unavailable item with the candidate replacement item by applying the trained outcome prediction model to the combination of the unavailable item, the candidate replacement item, customer features for customer from whom the order was received, and order features of the order (as well as contextual features of the order in some embodiments). In various embodiments, the predicted outcome metric is a predicted probability of a negative outcome from replacing the unavailable item with another item, such as the candidate replacement item. Alternatively, the predicted outcome metric is an expected profit to the online concierge system 140 from replacing the unavailable item with another item, such as the candidate replacement item.

As the predicted outcome metric provides a predicted probability of a negative outcome from replacing the unavailable item with another item or an expected profit to the online concierge system 140 from replacing the unavailable item with another item, the online concierge system 140 determines 335 whether the predicted outcome metric satisfies one or more criterion for recommending refunding the unavailable item. The criteria maintained by the online concierge system 140 evaluate whether replacing the unavailable item in the order with another item (e.g., with the candidate replacement item) is more beneficial to the online concierge system 140 than refunding the customer for the unavailable item. For example, a criterion is the predicted outcome metric exceeding a threshold probability. As another example, a criterion is the predicted outcome metric being less than a threshold amount of profit to the online concierge system 140. However, different or additional criteria may be maintained by the online concierge system 140 in various embodiments.

The online concierge system 140 maintains global criteria, such as global thresholds, which apply to multiple pickers, such as all pickers fulfilling orders for the online concierge system 140 to which the predicted outcome metric is evaluated. In some embodiments, the online concierge system 140 determines one or more picker-specific criteria to which the predicted outcome metric is compared that are specific to the picker from whom the indication of the unavailable item was received 320. In various embodiments, a picker-specific criterion is based on a number of orders that have previously been fulfilled by a picker. For example, a threshold amount of profit for the predicted outcome metric is inversely related to a number of orders previously fulfilled by the picker, so the threshold amount of profit is larger when the picker has previously fulfilled a smaller number of orders, and the threshold amount of profit is smaller when the picker has previously fulfilled a larger number of orders. As another example, a threshold probability of a negative outcome is directly related to a number of orders previously fulfilled by the picker, with the threshold probability lower when the picker has previously fulfilled a smaller number of orders and the threshold probability higher when the picker has previously fulfilled a larger number of orders. In some embodiments, the online concierge system 140 determines a threshold value for a criterion based on a logarithm of a number of orders previously fulfilled by a picker, while the online concierge system 140 determines picker-specific criteria based on other values related to the number of orders previously fulfilled by the picker in other embodiments. Further, the online concierge system 140 determines a threshold for a criterion as a maximum of a picker-specific threshold and a global threshold in various embodiments. Determining picker-specific criteria allows the online concierge system 140 to modify the criteria used for individual pickers and to adjust the criteria over time based on interactions by different pickers.

In response to determining 335 the predicted outcome metric for replacing the unavailable item included in the order with another item (e.g., with the candidate replacement item) satisfies at least one criterion, the online concierge system 140 determines it is more beneficial to refund the customer for the unavailable item than to replace the unavailable item with another item (e.g., the candidate replacement item). For example, if the predicted outcome metric is a predicted probability of a negative outcome, determining 335 the predicted outcome metric exceeds a threshold probability indicates it is more beneficial to refund the customer for the unavailable item than to replace the unavailable item with another item (e.g., the candidate replacement item). As another example, if the predicted outcome metric is an expected profit to the online concierge system 140 from replacing the unavailable item with another item (e.g., the candidate replacement item), determining 335 the predicted outcome metric is less than a threshold amount of profit to the online concierge system 140 indicates it is more beneficial to the online concierge system 140 to refund the unavailable item than to replace the unavailable item.

When the predicted outcome metric satisfies at least one criterion, the online concierge system 140 transmits 340 instructions to a picker client device 110 of the picker from whom the indication was received 320. The instructions modify a collection interface presented to the picker via a picker client device 110 to increase a difficulty of the picker selecting a replacement item for the unavailable item. In some embodiments, the instructions cause the picker client device 110 to display a notification message to the picker including a recommendation to refund the unavailable item rather than to obtain a replacement item for the unavailable item. In some embodiments, the notification message includes an interface element that, when selected by the picker, transmits a refund request from the picker client device 110 to the online concierge system 140. The notification message may also include an alternative interface element that, when selected by the picker, transmits a request for one or more replacement items for the unavailable item to the online concierge system 140.

In other embodiments, the instructions transmitted 340 from the online concierge system 140 to the picker client device 110 limit identification of a replacement item for the unavailable item to manual entry of an identifier of the replacement item by the picker. For example, the instructions prevent the picker client device 110 from capturing a barcode of a replacement item via a camera or a scanner when obtaining the replacement item for the unavailable item. For example, when a picker indicates an item is unavailable at a retailer, one or more collection interfaces presented by the picker client device 110 typically allow the picker to capture a barcode, a QR code, or other code identifying a replacement item for the unavailable item through a camera or a scanner of the picker client device 110 to identify the replacement item to the online concierge system 140. In response to receiving the instructions from the online concierge system 140, the picker client device 100 prevents the one or more collection interfaces from obtaining information identifying a replacement item via the camera or a scanner, causing the picker to manually enter information identifying the replacement item to the collection interface. Such an increase in difficulty to identify the replacement item discourages a picker from obtaining a replacement item for an unavailable item. In other embodiments, instructions transmitted 340 from the online concierge system 140 disable one or more collection interfaces where a picker provides information identifying a replacement item, preventing the picker from obtaining a replacement item.

In embodiments where the outcome prediction model 140 receives a candidate replacement item as input, instructions transmitted 340 to the picker client device 110 prevent inclusion of the candidate replacement item in an order in response to a predicted outcome metric from applying the trained outcome prediction model to the combination of the unavailable item, the candidate replacement item, customer features for the customer from whom the order was received, order features for the order satisfying at least one criterion. In various embodiments, the candidate replacement item is received from the picker fulfilling the order, such as included the indication of the unavailable item included in the order received 320 from the picker. For example, if replacing the unavailable item with the candidate replacement item results in an expected amount of profit to the online concierge system that is less than the threshold amount, instructions transmitted 340 from the online concierge system 140 to the picker client device 110 prevent selection of the candidate replacement item for the unavailable item. As another example, if replacing the unavailable item with the candidate replacement item results in greater than a threshold probability of a negative outcome from replacing the unavailable item with the candidate replacement item, the instructions prevent the picker from replacing the unavailable item with the candidate replacement item. This allows the online concierge system 140 to influence actions taken by a picker when an item in an order is unavailable by preventing replacement of the unavailable item with replacement items that do not provide at least a threshold benefit to the online concierge system 140. As compensation provided to a picker may account for a number of items in an order that are included in the fulfilled order, pickers may include replacement items for unavailable items in an order that have a large probability of a customer providing the order requesting appeasement or reducing subsequent interaction with the online concierge system 140. Using the predicted outcome metric determined 330 from replacing an unavailable item in an order with a replacement item allows the online concierge system 140 to proactively prevent pickers from including replacement items resulting in a predicted outcome metric satisfying one or more criterion in an order by transmitting instructions that prevent inclusion of such replacement items in an order.

In some embodiments, the instructions transmitted 340 to the picker client device 110 identify a set of validated replacement items to the picker. To determine validated replacement items, the online concierge system 140 determines a set of replacement items for an item, such as by applying a trained replacement item selection model to attributes of the item. The online concierge system 140 applies the trained outcome prediction model to the combination of the item, the replacement item, customer features for the customer from whom the order was received, and order features for the order. Based on the predicted outcome metrics corresponding to application of the trained outcome prediction model to each replacement item of the set, the online concierge system 140 identifies replacement items corresponding to predicted outcome metrics that do not identify at least one criterion as validated replacement items. For example, each validated replacement item has a predicted probability of a negative outcome for the online concierge system 140 that is less than the threshold probability. As another example, each validated replacement item has an expected amount of profit to the online concierge system that equals or exceeds a threshold amount.

Instructions transmitted 340 to a picker client device 110 display one or more of the set of validated replacement items determined for the unavailable item in a collection interface. In some embodiments, the validated replacement items are displayed in a ranking that is based on predicted outcome metrics when the trained outcome prediction model receives different validated replacement items as input. For example, the instructions cause the picker client device to display the set of validated replacement items in a ranking where validated replacement items with larger expected amounts of profit to the online concierge system are displayed in higher positions in the ranking than validated replacement items with smaller expected amounts of profit to the online concierge system. As another example, the validated replacement items are displayed in a ranking where validated replacement items with smaller probabilities of a negative outcome are displayed in higher positions of the ranking. The online concierge system 140 may determine sets of validated replacement items for each item in an order when the order is received and store a set of replacement items in association with a corresponding item of the order to expedite identification of validated items for the item identified as unavailable, decreasing an amount of time to transmit 340 instructions for identifying the set of validated items for the unavailable items. Displaying the set of validated replacement items to the picker simplifies identification and selectin of a validated item by the picker, increasing a probability of the picker selecting a validated replacement item for replacing the unavailable item.

Hence, the online concierge system 140 may leverage the outcome prediction model to determine whether to allow a picker to replace the unavailable item with a candidate replacement item that the picker identifies or that is otherwise identified to the online concierge system. Further, the online concierge system 140 may account for predicted outcome metrics for replacing an unavailable item with different candidate replacement items to identity certain candidate replacement items to a picker that increase a likelihood of a positive outcome for the online concierge system 140 when used to replace an unavailable item in an order. This allows the online concierge system to influence how a picker replaces an unavailable item to minimize a probability of the replacement causing a negative outcome from the customer for whom the item is being replaced.

The online concierge system 140 may transmit 340 different instructions to the picker client device 110 based on the predicted outcome metric in some embodiments. For example, the online concierge system 140 associates different criteria with different instructions and selects instructions to transmit 340 to the picker client device 110 based which criteria are satisfied by the predicted outcome metric. For example, the predicted outcome metric is a probability of a negative outcome and the online concierge system 140 transmits 340 instructions for displaying the notification message in response to the predicted outcome metric being greater than a first threshold probability, while the online concierge system 140 transmits 340 instructions for disabling capture of information identifying a replacement product through a camera or a scanner in response to the predicted outcome metric being greater than a second threshold probability that is greater than the first threshold probability. As another example, the predicted outcome metric is an expected amount of profit to the online concierge system 140 and the online concierge system 140 transmits 340 instructions for displaying the notification message in response to the predicted outcome metric being less than a first threshold expected profit, while the online concierge system 140 transmits 340 instructions for disabling capture of information identifying a replacement product through a camera or a scanner in response to the predicted outcome metric being less than a second threshold probability that is less than the first threshold probability. Transmitting different instructions to the picker client device 110 based on the predicted outcome metric allows the online concierge system 140 to adjust how one or more collection interfaces of the picker client device are modified based on the predicted outcome metric. Different modifications to the collection interface increase a difficulty or an amount of effort for the picker to select a replacement item for an unavailable item, decreasing a likelihood of the picker selecting a replacement item.

However, in response to determining 335 the predicted outcome metric for replacing the unavailable item included in the order with the candidate replacement item does not satisfy at least one criterion, the online concierge system 140 determines replacing the unavailable item with the candidate replacement item is at least as beneficial to the online concierge system 140 as refunding the unavailable item. Hence, the predicted outcome metric allows the online concierge system 140 to evaluate a benefit to the online concierge system 140 of the picker determining a replacement item for an unavailable item and to adjust a difficulty of a picker selecting a replacement item for the unavailable item. Increasing a difficulty of the picker selecting a replacement item for the unavailable item allows the online concierge system 140 to increase a likelihood of the picker refunding the unavailable item when the predicted outcome of selecting a replacement item provides less than a threshold benefit to the online concierge system 140. This allows the online concierge system 140 to more optimally allocate a picker's time when fulfilling an order.

Figure 4:
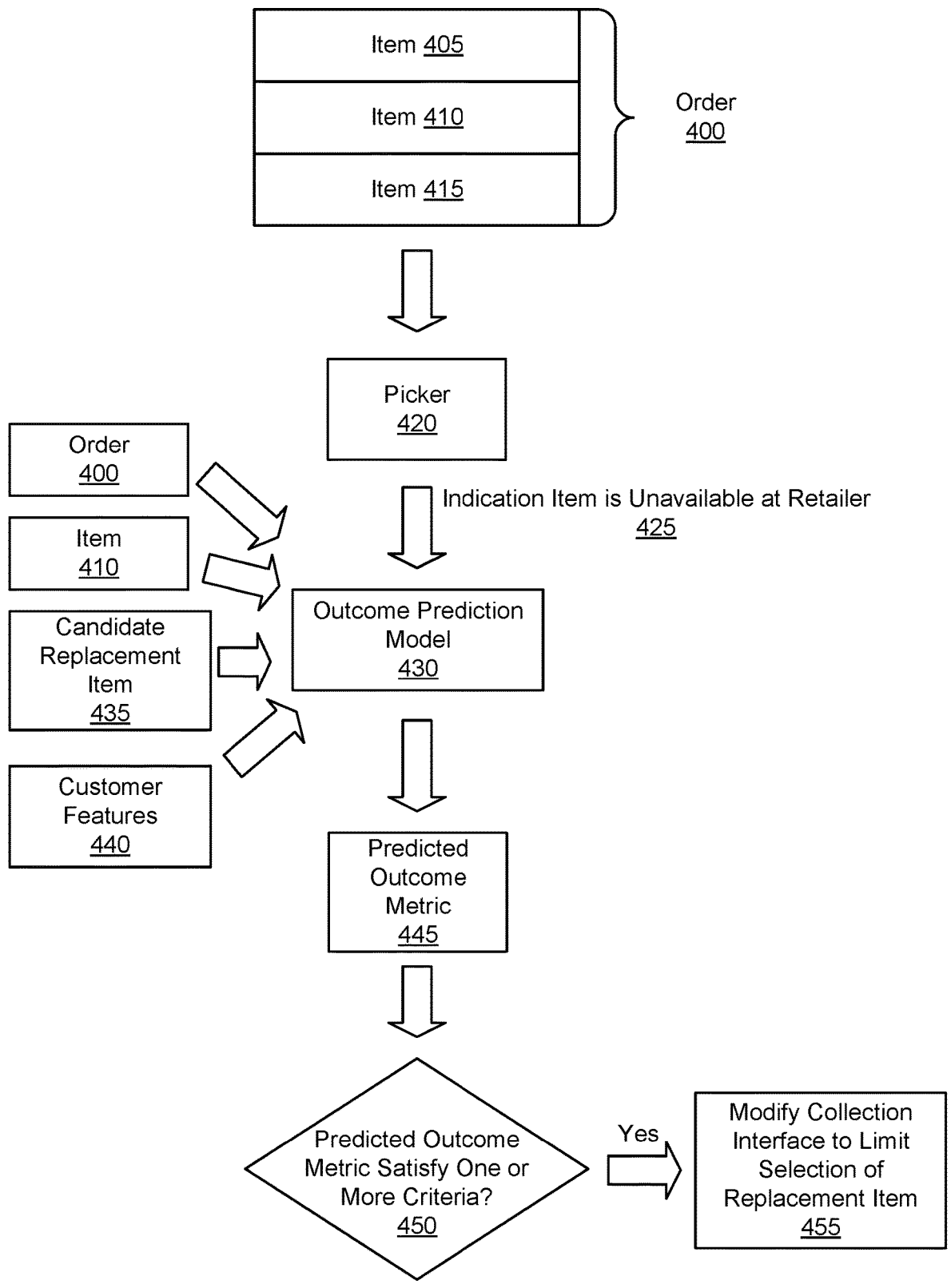
FIG. 4 is a process flow diagram of a method for determining when a picker obtains a replacement item for an item included in an order using a trained outcome prediction model, in accordance with one or more embodiments.

FIG. 4 is a process flow diagram of a method for determining when a picker obtains a replacement item for an item included in an order received by an online concierge system 140 using a trained outcome prediction model. As shown in FIG. 4, the online concierge system 140 receives an order 400 from a customer. The order 400 includes one or more items and identifies a retailer from which the one or more items are to be obtained. In the example of FIG. 4, the order 400 includes item 405, item 410, and item 415. However, in other embodiments, the order 400 includes any number of items. In various embodiments, the order 400 includes a location and a time interval for delivery of the one or more items included in the order 400, although different or additional information may be included in the order 400 in various embodiments.

The online concierge system 140 allocates the order 400 to a picker 420, who obtains the items included in the order 400 from the retailer identified by the order 400. For example, the picker 420 selects the order 400 from the online concierge system 140 and obtains the items included in the order 400 from the retailer identified in the order. In other embodiments, the online concierge system 140 allocates the order 400 to the picker 420 for fulfillment from the retailer identified by the order 400.

As the picker 420 obtains items included in the order 400, one or more items included in the order may be unavailable from the retailer identified in the order 400. If an item in the order 400 is unavailable, a collection interface displayed by a picker client device 110 of the picker 420 allows the picker 420 to transmit an indication 425 that the item is unavailable at the retailer to the online concierge system 140. For example, the picker 420 selects an item included in the order 400 and an interface element causing the picker client device 110 to transmit the indication 425 the selected item is unavailable at the retailer. The indication 425 includes an identifier of the item that is unavailable (the "unavailable item"), an identifier of the order 400, and an identifier of the retailer. In some embodiments, the indication 425 includes different or additional information. For purposes of illustration, FIG. 4 shows an example where item 410 included in the order 400 is unavailable, so the indication 425 received by the online concierge system 140 identifies item 410.

When an item included in the order 400 is unavailable at the retailer specified by the order, the picker 420 may transmit a refund request to the online concierge system 140, causing the online concierge system 140 refund an amount corresponding to the unavailable item to the customer. In the example of FIG. 4, a refund request from the picker 420 refunds an amount corresponding to item 410 to the customer. However, refunding the customer decreases revenue to the online concierge system 140, as the online concierge system 140 does not receive compensation from obtaining item 410.

To mitigate potential revenue loss from an unavailable item in an order, the online concierge system 140 enables the picker 420 to select a replacement item that is included in the order 400 in place of an unavailable item. In the example of FIG. 4, the picker 420 may obtain a replacement item that replaces item 410, which is unavailable at the retailer. While obtaining a replacement item for an unavailable item allows the online concierge system 140 to receive compensation based on the replacement item, identifying, and obtaining the replacement item takes additional time by the picker 420, increasing time for order fulfillment and an amount of compensation the picker 420 receives for fulfilling the order 400. Additionally, the replacement item may be unsatisfactory to the customer, causing the online concierge system 140 to refund to the customer the amount of the replacement item, or another amount, which reduces revenue obtained by the online concierge system 140 for fulfilling the order 400 and decreases a likelihood of subsequent customer interaction with the online concierge system 140.

To mitigate potential compensation to the customer for a replacement item replacing an unavailable item (item 410 in FIG. 4) in the order 400, the online concierge system 140 trains an outcome prediction model 430, as further described above in conjunction with FIG. 3. The outcome prediction model 430 receives order features of the order 400, the unavailable item (item 410), a candidate replacement item 435, and customer features 440 of the customer from whom the order 400 was received. Alternatively, the outcome prediction model 430 receives order features of the order 400, the unavailable item (item 410), and customer features 440 of the customer from whom the order 400 was received without receiving a candidate replacement item 435. In various embodiments, the outcome prediction model 430 also receives contextual features describing prior replacement of items in orders. The online concierge system 140 may determine the candidate replacement item 435 through application of a replacement model to the order 400, the unavailable item, and to the customer in some embodiments, while the online concierge system 140 determines the candidate replacement item 435 through other methods in other embodiments. Alternatively, the picker 420 fulfilling the order 400 identifies the candidate replacement item 435 to the online concierge system 140. For example, the picker 420 transmits an indication to the online concierge system 140 that the picker 420 intends to replace item 410 with the candidate replacement item 435. Based on the received inputs, the outcome prediction model 430 outputs a predicted outcome metric 445, as further described above in conjunction with FIG. 3.

In some embodiments, the predicted outcome metric 445 is a predicted probability of a negative outcome from replacing the unavailable item (item 410) with the candidate replacement item 435. As further described above in conjunction with FIG. 3, in various embodiments, the online concierge system 140 determines a negative outcome occurs in response to the online concierge system receiving negative feedback for the candidate replacement item 435 when included in the order 400 from the customer from whom the order 400 was received, the online concierge system 140 receiving an appeasement request (e.g., a request for a refund) from the customer from whom the order 400 was received, or the online concierge system 140 receiving an indication an item was missing from the order 400 from the customer from whom the order 400 was received. In other embodiments, the online concierge system 140 maintains different or additional criteria for determining a negative outcome occurred from fulfilling the order 400 with the candidate replacement item 435 in place of item 410. In other embodiments, the predicted outcome metric is an expected amount of profit to the online concierge system 140 from fulfilling the order 400 including replacement item 435 in place of item 410. As further described above in conjunction with FIG. 3, the expected amount of profit determined by the outcome prediction model 430 accounts for an amount of revenue the online concierge system 140 obtains from including the candidate replacement item 435 in the order 400 reduced by a cost incurred from the picker 420 obtaining the candidate replacement item 435 and by a cost to the online concierge system 140 for compensating a customer for an appeasement request in response to the customer being dissatisfied with inclusion of the candidate replacement item 435 in the order 400 in place of item 410. As further described above in conjunction with FIG. 3, in various embodiments, the expected amount of profit may account for a long-term profit from the customer to the online concierge system 140 over an extended time interval, with the expected amount of profit determined by summing an amount of revenue the online concierge system 140 obtains from including the candidate replacement item 435 in the order 400 with the expected long-term profit and subtracting the cost incurred from the picker 420 obtaining the candidate replacement item 435 and by a cost to the online concierge system 140 for compensating a customer for an appeasement request in response to the customer being dissatisfied with inclusion of the candidate replacement item 435 in the order 400 in place of item 410 from the sum. If the outcome prediction model 430 receives the candidate replacement item 435 as an input, the expected profit may not account for the cost incurred from the picker 420 obtaining the candidate replacement item 435. In other embodiments, the predicted outcome metric 445 represents another measure of an outcome of including the candidate replacement item 435 in the order 400 in place of item 410.

The online concierge system 140 determines 450 whether the predicted outcome metric 445 satisfies one or more criteria to determine whether refunding the customer a cost of item 410 is more beneficial than fulfilling the order 400 with another item, such as the candidate replacement item 435 in place of item 410. In embodiments where the predicted outcome metric 445 is a predicted probability of a negative outcome, the online concierge system 140 determines 450 whether the predicted probability of the negative outcome is greater than a threshold probability. In embodiments where the predicted outcome metric 445 is an expected amount of profit to the online concierge system 140, the online concierge system 140 determines 450 whether the expected amount of profit to the online concierge system 140 is less than a threshold amount. The online concierge system 140 may maintain one or more global criteria to which the predicted outcome metric 445 is compared or may maintain one or more picker-specifier criteria based on attributes of the picker 420 fulfilling the order 400 for evaluating the predicted outcome metric 445.

In response to the predicted outcome metric satisfying 450 at least one criterion, the online concierge system 140 determines refunding the customer for item 410 is more beneficial than fulfilling the order 400 with a replacement item in place of item 410. For example, refunding the customer for item 410 is more beneficial in response to a predicted probability of a negative outcome from replacing the unavailable item with the candidate replacement item 435 exceeding the threshold probability. As another example, refunding the customer for item 410 is more beneficial in response to an expected amount of profit to the online concierge system 140 from replacing the unavailable item with the candidate replacement item 435 being less than a threshold amount.

When it is more beneficial to refund the customer for item 410 (i.e., for an unavailable item), the online concierge system 140 transmits instructions to the picker client device 110 of the picker 420 that modify 455 one or more collection interfaces to increase a difficulty to the picker of obtaining a replacement item for item 410. For example, a collection interface is modified 455 to display a notification message to the picker 420 that the online concierge system 140 recommends refunding the customer for item 410. As another example, a collection interface is modified 455 to prevent the picker client device 110 from extracting an identifier of a replacement item from an image captured by the picker client device 110. In this example, the identification of the replacement item may be limited to the picker 420 manually entering an identifier of a replacement item for item 410 through the collection interface, making identification of the replacement item more time consuming and cumbersome. In other embodiments, the collection interface is modified 455 to prevent identification of a replacement item for item 410. The online concierge system 140 may determine different modifications to the collection interface based on characteristics of the picker 420, based on the predicted outcome metric 435, or based on other information. Modifying one or more collection interfaces in response to determining whether 450 the predicted outcome metric 445 satisfies one or more criteria allows the online concierge system 140 to increase a difficulty of the picker 420 obtaining a replacement item for 410, discouraging the picker from obtaining a replacement item and encouraging the picker 420 to instead provide a refund for item 410, providing a greater benefit to the online concierge system 140.

When modifying 455 the collection interface, the instructions from the online concierge system 140 to the picker client device 110 may prevent inclusion of the candidate replacement item 435 in the order 400 in response to a predicted outcome metric 445 accounting for the candidate replacement item 435 satisfying at least one criterion. For example, if replacing the unavailable item (e.g., item 410) with the candidate replacement item 435 results in an expected amount of profit to the online concierge system 140 that is less than the threshold amount, instructions transmitted by the online concierge system 140 modify 455 the collection interface to prevent selection of the candidate replacement item 435 for the unavailable item. As further described above in conjunction with FIG. 3, modification to the collection interface may identify a set of validated replacement items to the picker. Each validated replacement item has a predicted outcome metric 445 that does not satisfy at least one criterion, when the outcome prediction model 430 is applied to order features of the order 400, the unavailable item (item 410), a candidate replacement item 435, customer features 440 of the customer from whom the order 400 was received, and the validated replacement item, as further described above in conjunction with FIG. 3. The set of validated replacement items may be displayed in an order based on predicted outcome metrics 445 for each validated replacement item. For example, validated replacement items with larger expected amounts of profit to the online concierge system are displayed in higher positions in the ranking than validated replacement items with smaller expected amounts of profit to the online concierge system.

Hence, the modifications 455 to a collection interface based on one or more predicted outcome metrics 445 may influence the picker's 420 selection of a replacement item for the unavailable item (e.g., item 410). Preventing the picker 420 from replacing the unavailable item with a candidate replacement item 435 with a predicted outcome metric 445 decreases a likelihood of the picker 420 including a candidate replacement item 435 in the order 400 that results in a negative outcome to the online concierge system

140. Additionally or alternatively, displaying validated replacement items via the collection interface allows a picker to more easily identify replacement items that do not result in a predicted outcome metric 445 that satisfies at least one criterion. Having the validated replacement items more readily identifiable from the collection interface increases a probability of the picker 420 selecting a replacement item for the unavailable item that does not have a negative outcome for the online concierge system 140.

ADDITIONAL CONSIDERATIONS

The foregoing description of the embodiments has been presented for the purpose of illustration; modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a non-transitory computer readable medium, comprising:
   receiving an order from a user of the computer system, the order identifying one or more items and a retailer from which the one or more items are to be obtained;
   receiving, at the computer system, an indication from a picker that an item included in the order is unavailable at the retailer;
   determining a predicted outcome metric for replacing the item with another item by applying an outcome prediction model to the item, order features for the order, and user features of the user, the outcome prediction model trained by:
      obtaining a training dataset including a plurality of training examples based on previously fulfilled orders, each training example including an item from a previously fulfilled order, a replacement item for the item from the previously fulfilled order, user features for a user from whom the previously fulfilled order was received, and order features for the previously fulfilled order, each training example having a label indicating an outcome of the previously fulfilled order;
      applying the outcome prediction model to each training example of the training dataset to generate a predicted outcome metric for the training example when the item from the previously fulfilled order is replaced with the replacement item for the item from the previously fulfilled order;
      scoring the outcome prediction model using a loss function based on the predicted outcome metric for the training example and the label of the training example; and
      updating one or more parameters of the outcome prediction model by backpropagation based on the scoring until one or more criteria are satisfied;
   determining that the predicted outcome metric for the order satisfies one or more criteria; and
   transmitting one or more instructions to a picker client device of the picker that modify one or more collection interfaces to increase a difficulty of identifying a replacement item for the item in response to determining that the predicted outcome metric for the order satisfies one or more criteria.

2. The method of claim 1, wherein the predicted outcome metric comprises a probability of a negative outcome from replacing the item of the order with the replacement item.

3. The method of claim 2, wherein the negative outcome comprises at least one of: the computer system receiving negative feedback for the replacement item when included in the order from the user, the computer system receiving an appeasement request from the user when the replacement item is included in the order, or the computer system receiving an indication the item was missing from the order from the user.

4. The method of claim 2, wherein transmitting one or more instructions to the picker client device of the picker that modify one or more collection interfaces to increase the difficulty of identifying the replacement item for the item in response to determining the predicted outcome metric for the order satisfies one or more criteria comprises:
transmitting one or more instructions to the picker client device of the picker that modify one or more collection interfaces to increase the difficulty of identifying the replacement item for the item in response to determining the predicted probability of the negative outcome from replacing the item of the order with the replacement item is greater than a threshold probability.

5. The method of claim 1, wherein the predicted outcome metric comprises an expected profit from replacing the item of the order with the replacement item.

6. The method of claim 5, wherein transmitting one or more instructions to the picker client device of the picker that modify one or more collection interfaces to increase the difficulty of identifying the replacement item for the item in response to determining the predicted outcome metric for the order satisfies one or more criteria comprises:
transmitting one or more instructions to the picker client device of the picker that modify one or more collection interfaces to increase the difficulty of identifying the replacement item for the item in response to determining the expected profit is less than a threshold amount.

7. The method of claim 1, wherein transmitting one or more instructions to the picker client device of the picker that modify one or more collection interfaces to increase the difficulty of identifying the replacement item for the item in response to determining the predicted outcome metric for the order satisfies one or more criteria comprises:
transmitting one or more instructions to the picker client device that display a notification message via a collection interface prompting the picker to refund the item rather than obtain the replacement item.

8. The method of claim 1, wherein transmitting one or more instructions to the picker client device of the picker that modify one or more collection interfaces to increase the difficulty of identifying the replacement item for the item in response to determining the predicted outcome metric for the order satisfies one or more criteria comprises:
transmitting one or more instructions to the picker client device that limit identification of the replacement item for the item to manual entry of an identifier of the replacement item by the picker.

9. The method of claim 1, wherein determining the predicted outcome metric for replacing the item with another item by applying the outcome prediction model to the item, order features for the order, and user features of the user comprises:
determining the predicted outcome metric for replacing the item with the replacement item by applying the outcome prediction model to the item, a replacement item, order features for the order, and user features of the user.

10. The method of claim 9, wherein transmitting one or more instructions to the picker client device of the picker that modify one or more collection interfaces to increase the difficulty of identifying the replacement item for the item in response to determining that the predicted outcome metric for the order satisfies one or more criteria comprises:
transmitting one or more instructions to the picker client device that prevent selection of the replacement item by the picker in response to determining the predicted outcome metric for the order satisfies one or more criteria.

11. The method of claim 9, wherein transmitting one or more instructions to the picker client device of the picker that modify one or more collection interfaces to increase the difficulty of identifying the replacement item for the item in response to determining that the predicted outcome metric for the order satisfies one or more criteria comprises:
transmitting one or more instructions to the picker client device that display a set of validated replacement items to the picker, the outcome prediction model determining a predicted outcome metric for the order including a validated replacement item when applied to the item, order features for the order, the validated replacement item, and user features of the user.

12. A computer program product comprising a non-transitory computer readable storage medium having instructions encoded thereon that, when executed by a processor, cause the processor to perform steps comprising:
receiving an order from a user, the order identifying one or more items and a retailer from which the one or more items are to be obtained;
receiving an indication from a picker that an item included in the order is unavailable at the retailer;
determining a predicted outcome metric for replacing the item with another item by applying an outcome prediction model to the item, order features for the order, and user features of the user, the outcome prediction model trained by:
obtaining a training dataset including a plurality of training examples based on previously fulfilled orders, each training example including an item from a previously fulfilled order, a replacement item for the item from the previously fulfilled order, user features for a user from whom the previously fulfilled order was received, and order features for the previously fulfilled order, each training example having a label indicating an outcome of the previously fulfilled order;
applying the outcome prediction model to each training example of the training dataset to generate a predicted outcome metric for the training example when the item from the previously fulfilled order is replaced with the replacement item for the item from the previously fulfilled order;
scoring the outcome prediction model using a loss function based on the predicted outcome metric for the training example and the label of the training example; and
updating one or more parameters of the outcome prediction model by backpropagation based on the scoring until one or more criteria are satisfied;
determining that the predicted outcome metric for the order satisfies one or more criteria; and transmitting one or more instructions to a picker client device of the picker that modify one or more collection interfaces to increase a difficulty of identifying a replacement item for the item in response to determining that the predicted outcome metric for the order satisfies one or more criteria.

13. The computer program product of claim 12, wherein the predicted outcome metric comprises a probability of a negative outcome from replacing the item of the order with the replacement item.

14. The computer program product of claim 13, wherein transmitting one or more instructions to the picker client device of the picker that modify one or more collection interfaces to increase the difficulty of identifying the replacement item for the item to an online system in response to determining the predicted outcome metric for the order satisfies one or more criteria comprises:
    transmitting one or more instructions to the picker client device of the picker that modify one or more collection interfaces to increase the difficulty of identifying the replacement item for the item to the online system in response to determining the predicted probability of the negative outcome from replacing the item of the order with the replacement item is greater than a threshold probability.

15. The computer program product of claim 12, wherein the predicted outcome metric comprises an expected profit to an online system from replacing the item of the order with the replacement item.

16. The computer program product of claim 15, wherein transmitting one or more instructions to the picker client device of the picker that modify one or more collection interfaces to increase the difficulty of identifying the replacement item for the item to the online system in response to determining the predicted outcome metric for the order satisfies one or more criteria comprises:
    transmitting one or more instructions to the picker client device of the picker that modify one or more collection interfaces to increase the difficulty of identifying the replacement item for the item to the online system in response to determining the expected profit to the online system is less than a threshold amount.

17. The computer program product of claim 12, wherein transmitting one or more instructions to the picker client device of the picker that modify one or more collection interfaces to increase the difficulty of identifying the replacement item for the item to an online system in response to determining the predicted outcome metric for the order satisfies one or more criteria comprises:
    transmitting one or more instructions to the picker client device that display a notification message via a collection interface prompting the picker to refund the item rather than obtain the replacement item.

18. The computer program product of claim 12, wherein transmitting one or more instructions to the picker client device of the picker that modify one or more collection interfaces to increase the difficulty of identifying the replacement item for the item to an online system in response to determining the predicted outcome metric for the order satisfies one or more criteria comprises:
    transmitting one or more instructions to the picker client device that limit identification of the replacement item for the item to manual entry of an identifier of the replacement item by the picker.

19. The computer program product of claim 12, wherein determining the predicted outcome metric for replacing the item with another item by applying the outcome prediction model to the item, order features for the order, and user features of the user comprises:
    determining the predicted outcome metric for replacing the item with the replacement item by applying the outcome prediction model to the item, a replacement item, order features for the order, and user features of the user.

20. A system comprising:
a processor; and
a non-transitory computer readable medium having instructions encoded thereon that, when executed by the processor, cause the processor to perform steps comprising:
    receiving an order from a user of the computer system, the order identifying one or more items and a retailer from which the one or more items are to be obtained;
    receiving, at the computer system, an indication from a picker that an item included in the order is unavailable at the retailer;
    determining a predicted outcome metric for replacing the item with another item by applying an outcome prediction model to the item, order features for the order, and user features of the user, the outcome prediction model trained by:
        obtaining a training dataset including a plurality of training examples based on previously fulfilled orders, each training example including an item from a previously fulfilled order, a replacement item for the item from the previously fulfilled order, user features for a user from whom the previously fulfilled order was received, and order features for the previously fulfilled order, each training example having a label indicating an outcome of the previously fulfilled order;
        applying the outcome prediction model to each training example of the training dataset to generate a predicted outcome metric for the training example when the item from the previously fulfilled order is replaced with the replacement item for the item from the previously fulfilled order;
        scoring the outcome prediction model using a loss function based on the predicted outcome metric for the training example and the label of the training example; and
        updating one or more parameters of the outcome prediction model by backpropagation based on the scoring until one or more criteria are satisfied;
    determining that the predicted outcome metric for the order satisfies one or more criteria; and
    transmitting one or more instructions to a picker client device of the picker that modify one or more collection interfaces to increase a difficulty of identifying a replacement item for the item in response to determining that the predicted outcome metric for the order satisfies one or more criteria.

* * * * *